Dec. 31, 1957     G. L. JOHNSON     2,818,268
FOLDING BOAT TRAILER
Filed May 15, 1956     2 Sheets-Sheet 1
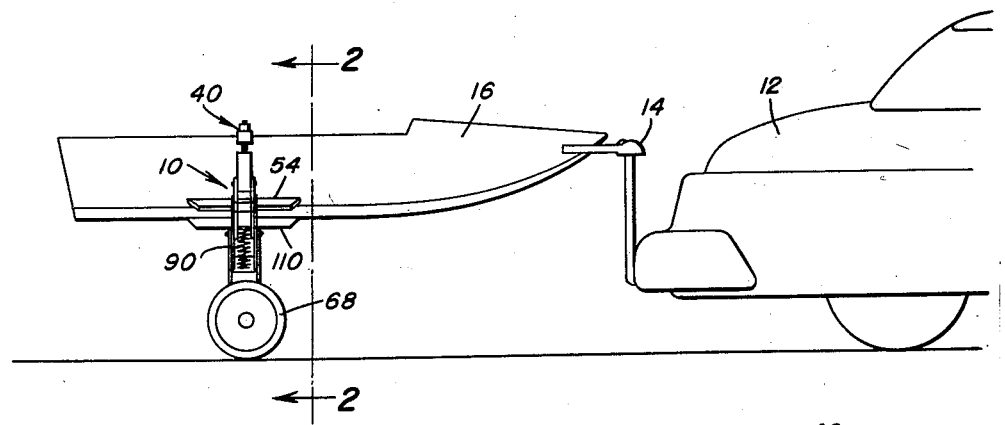
Fig. 1
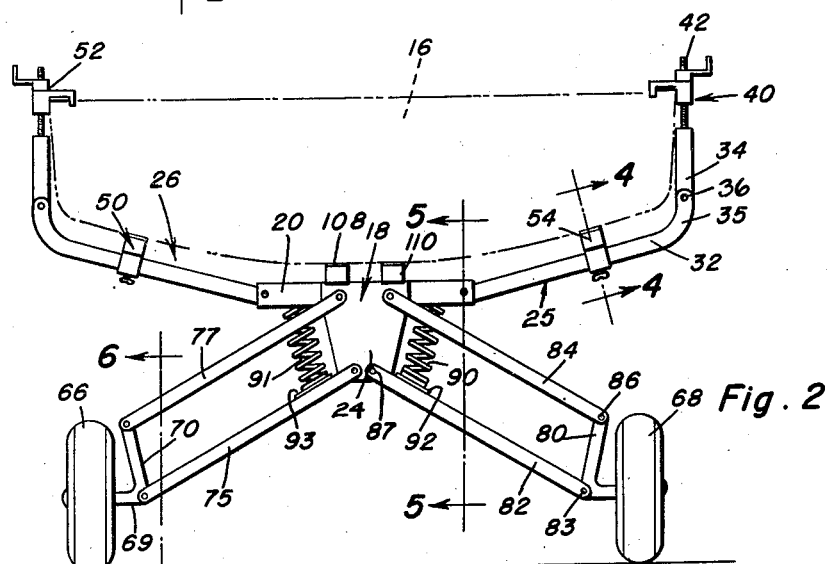
Fig. 2
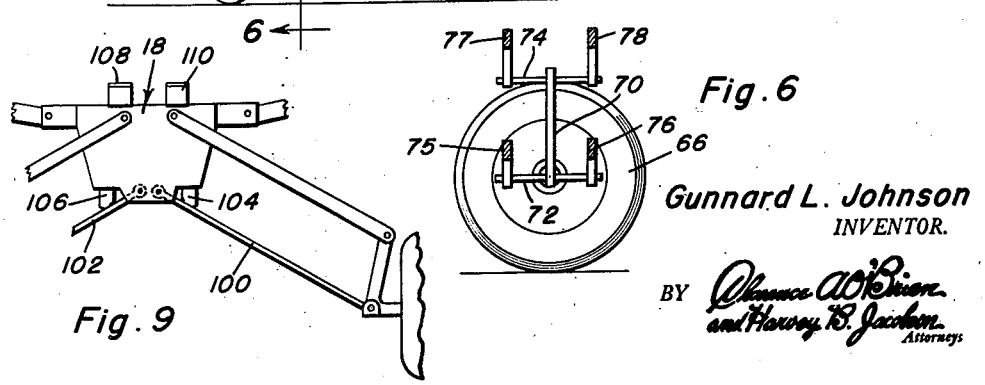
Fig. 6
Fig. 9
Gunnard L. Johnson
INVENTOR.

Dec. 31, 1957  G. L. JOHNSON  2,818,268
FOLDING BOAT TRAILER
Filed May 15, 1956  2 Sheets-Sheet 2

Gunnard L. Johnson
INVENTOR.

BY
Attorneys 2,818,268
Patented Dec. 31, 1957

2,818,268
FOLDING BOAT TRAILER
Gunnard L. Johnson, Elmhurst, Ill.

Application May 15, 1956, Serial No. 584,924

6 Claims. (Cl. 280—42)

This invention relates to boat trailers and particularly to a boat trailer which is capable of being folded and stored in a minimum of space.

An object of the present invention is to provide a folding boat trailer which is so constructed that when supporting a boat for transportation thereof or for temporary support in a still position, the trailer is sturdy and strong, and yet the trailer is so constructed that it is capable of being folded for storage in a minimum of volume. To achieve this, the invention provides a body to which a pair of folding arms are pivotally connected, these arms having clamps at their extremities in order to attach to the gunwales of the boat and having rests on which the bottom of the boat is drawn rather tightly in response to tightening of the clamps. In addition, the body supports a pair of wheels through the intermediate structure of a plurality of pairs of rods connected with wheel supporting knees and the body, the rods being arranged in parallelogram fashion with the knees and the body so that they may be swung with the rods to a compact position on the body.

A further object of the present invention is to provide a boat trailer of the general nature described above wherein there are improved resilient means functioning as cushioning devices or springs for the boat trailer. These resilient means may assume several forms, it being preferred that either leaf or coil springs be adopted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the trailer showing it in a typical use;

Figure 2 is a sectional view taken approximately on the line 2—2, the boat being shown schematically;

Figure 6 is a sectional view taken on a line 6—6 of Figure 2;

Figure 9 is a fragmentary elevational view of a slightly modified form of the boat trailer.

Figure 3:
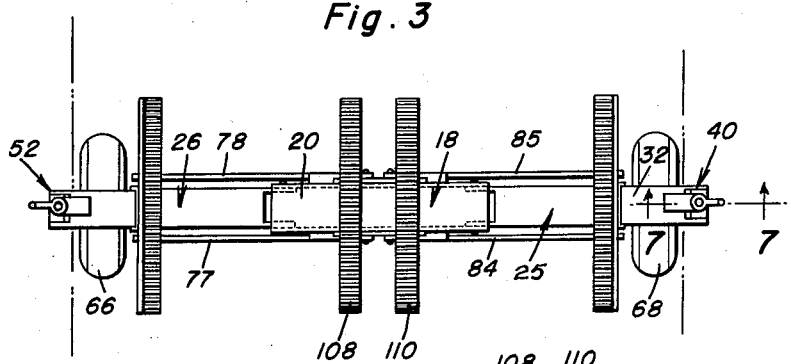
Figure 3 is a top plan view of the structure in Figure 2.
Figure 5:
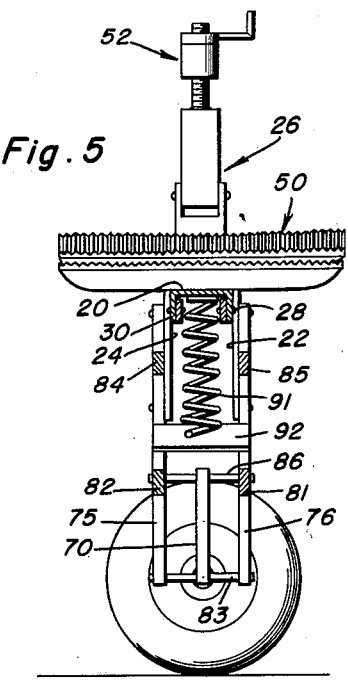
Figure 5 is a sectional view taken on a line 5—5 of Figure 2.
Figure 8:
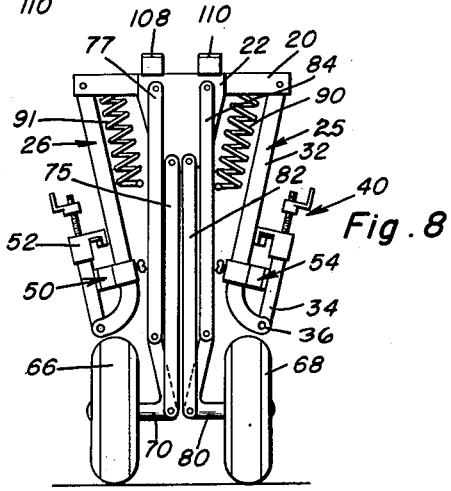
Figure 8 is an elevational view of the trailer in the folded position.
Figure 7:
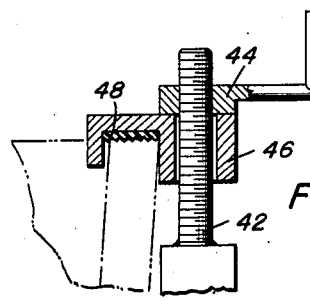
Figure 7 is a sectional view taken on a line 7—7 of Figure 3 and illustrating particularly one of the clamps for the top edges of the gunwales of the boat.
Figure 4:
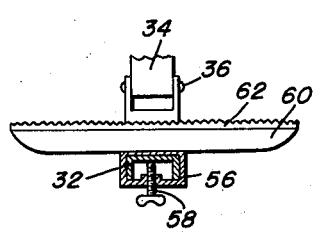
Figure 4 is a sectional view taken on the line 4—4 of Figure 2 and showing particularly one of the seats on which the boat rests while the trailer is in use.

In order to illustrate the principles of the invention there is the trailer 10 shown in use in Figure 1 and shown in the folded position in Figure 8, the latter position being for storage or transportation, shipment, or general non-use. A typical motor vehicle 12 is in Figure 1, this motor vehicle having a hitch 14 at the back bumper thereof schematically representing any standard type of hitch and suitably connected to the bow of the boat 16.

Trailer 10 consists of a body 18 whose construction may be a single casting or a built-up arrangement such as the downwardly opening channel 20 having plates 22 and 24 welded to its sides. Arms 25 and 26, respectively, protrude from the opposite ends of the channel 20. The arm 25 has ears at its inner extremity, and these ears are connected by pivot pins 28 and 30 to the channel 20, thereby pivotally securing the arm to the body 18. Arm 25 is composed of two parts 32 and 34, respectively, the part 32 having a curved extremity 35 to which part 34 is pivoted, as by having pivot pins 36 passed through ears on part 32 and in openings in part 34. Both parts are preferably, but not necessarily, of channel shaped cross-section. The outer extremity of part 34 is fitted with a clamp 40 made by a threaded rod 42 which is welded or otherwise fixed to the extremity of part 34 and a handled nut 44 on threaded rod 42, the nut bearing on hook 46 that is loosely fitted on rod 42. A resilient pad 48 is in the bill of the hook so that when the hook is clamped tightly on the upper edge of the gunwale of the boat 16, it will not mar the finish thereof. Arm 26 is of identical construction and is fitted with an adjustable seat 50 on which the bottom of the boat is pressed when clamp 52 is tightened on the opposite gunwale of the boat. Seat 54 on arm 25 is identical to seat 50, and it consists of collar 56 slidable on part 32 of arm 25 and having a thumb nut 58 carried by it. This thumb nut bears against a surface of a part of arm 25. Cradle member 60 is welded or otherwise fixed to collar 56 and has a resilient pad 62 on the top surface thereof. The boat is, of course, adapted to seat upon the pad 62.

There are a pair of wheels 66 and 68 which are used to support the trailer. Wheel 66 is on spindle 69, the latter constituting a part of the knee member 70. Lower and upper pivots 72 and 74 are attached to the knee member 70. A lower pair of rods 75 and 76 are pivoted near the ends of lower pivot 72, while an upper pair 77 and 78 of rods are pivoted near the extremities of upper pivot 74. These rods are pivotally attached at their upper ends to the plates 22 and 24 of body 18 in parallelogram fashion. Wheel 68 is supported by knee member 80, the latter having a lower pair of rods 81 and 82 on a lower pivot 83 at knee member 80 and an upper pair of rods 84 and 85 on an upper pivot 86, the latter also being connected to knee member 80. The opposite extremities of rods 81 and 82 are connected by pivots 87 to the plates 22 and 24, while the extremities of rods 84 and 85 are similarly connected to the same plates. Since the knee members 70 and 80 with their rods and parts of the body 18 constitute a pair of separate parallelogram structures, the wheels are capable of being swung to the position shown in Figure 8 or the operative, using position shown in Figure 2.

When in the last-mentioned position, springs 90 and 91 that are nested in channel 20 and connected thereto, come to bear against plates 92 and 93, the latter being secured to and bridging the lower pairs of rods in the wheel supporting assemblies. The springs act as shock arresters and a general spring suspension for the trailer when it is being used.

Attention is now invited to Figure 9 where a slight modification is illustrated. In this case, all of the structure is essentially the same with the distinction being in the resilient springing. The pairs of lowermost rods 100 and 102 in Figure 9 are leaf springs instead of rigid rods. Accordingly, rubber bumpers 104 and 106 are fixed to the body 18 of Figure 9 and are contacted by these leaf springs during the use of the trailer. In all other respects the modification of Figure 9 is the same as the previously described modification.

In use, the boat 16 is loaded onto the trailer. The gunwale clamps are attached to the boat and it is drawn down tightly onto the top surfaces of the seats. After hitching the bow of the boat to the motor vehicle, the boat owner is ready to transport it. At the end of the season or at any other time within the desires of the owner, the trailer is capable of being collapsed to the position shown in Figure 8. This is occasioned by swinging the arms 25 and 26 downwardly together with the wheels and their parallelogram supporting rods.

The drawings illustrate four seats 50, 54, 108 and 110, the latter two seats being on the body 18. It is apparent that the number of seats may be reduced or increased in accordance with the necessities of the particular boat and size of boat for which the trailer is designed. Other modifications as fall within the scope of the invention may be made. Accordingly, limitation is sought only in accordance with the scope of the following claims.

What is claimed as new is as follows:

1. A folding boat trailer comprising a central body, arms pivoted at their inner ends to said body, clamps at the outer ends of said arms to fasten to the gunwales of the boat, a knee member on each side of said body, a wheel on each knee member, a pair of parallel rods secured to each knee member and to said body, and resilient means reacting on said arms and said body and opposing the pivotal movement of said pairs of rods in one direction so as to yieldingly support the boat, said arms and rods and knee members and said wheels being pivotable to a folded position with respect to said body.

2. A folding boat trailer comprising a central body, arms pivoted at their inner ends to said body, clamps at the outer ends of said arms to fasten to the gunwales of the boat, a knee member on each side of said body, a wheel on each knee member, a pair of parallel rods secured to each knee member and to said body, resilient means reacting on said arms and said body and opposing the pivotal movement of said pairs of rods in one direction so as to yieldingly support the boat, said arms and rods and knee members and said wheels being pivotable to a folded position with respect to said body, a seat on each of said arms on which the bottom of the boat is adapted to rest, and at least one seat carried by said body which is also adapted to support the bottom of the boat.

3. The folding boat trailer of claim 2 wherein said seats on said arms each comprises a clamp adjustably disposed on one arm and provided with a pad on one surface thereof.

4. In a folding boat trailer, the combination of a central rigid body, a pair of wheels, upper and lower pairs of rods for each wheel and pivoted at their inner ends to said central body, a knee at the outer end of each of said pairs of upper and lower rods and on which one of said wheels is mounted for rotation, resilient means opposing the movement of said rods in one direction with respect to said central body in order to form a spring suspension for the trailer, said pairs of rods being freely pivotally movable in the opposite direction to a position at which they depend from said central body, a pair of arms pivoted to said body, means to clamp said arms onto the gunwales of the boat, means pivotally mounting said arms on said body so that said arms are capable of being swung to an inoperative position alongside of said pairs of rods, and seats for the bottom of the boat carried by said arms.

5. The combination of claim 4 together with additional seats for the bottom of the boat, said additional seats being carried by said body and being located between the seats on said arms.

6. The combination of claim 1 wherein each of said arms is articulated and includes an inner and outer part pivotally connected together at confronting ends thereof.

References Cited in the file of this patent

UNITED STATES PATENTS

| D. 170,636 | Gastright | Oct. 20, 1953 |
| 2,503,535 | Yarbrough | Apr. 11, 1950 |
| 2,551,040 | Newell | May 1, 1951 |
| 2,608,418 | Finlayson | Aug. 26, 1952 |
| 2,610,072 | Head | Sept. 9, 1952 |
| 2,688,494 | Wilson | Sept. 7, 1954 |

FOREIGN PATENTS

| 5,145 | Great Britain | of 1912 |